United States Patent [19]

Espirito Santo

[11] Patent Number: 5,022,748
[45] Date of Patent: Jun. 11, 1991

[54] SUPPORT FOR AN EXTERNAL REARVIEW MIRROR FOR MOTOR VEHICLES

[75] Inventor: Antonio F. Espirito Santo, Sao Paulo, Brazil

[73] Assignee: Metagal Industria e. Comercia Ltda., Sao Paulo, Brazil

[21] Appl. No.: 550,109

[22] Filed: Jul. 6, 1990

[30] Foreign Application Priority Data

Dec. 11, 1989 [BR] Brazil .................. 6902578[U]

[51] Int. Cl.$^5$ .................................................. G02B 7/18
[52] U.S. Cl. .................... 350/639; 350/632; 248/486
[58] Field of Search ............. 350/604, 631, 632, 639; 248/479, 486; 74/502.1

[56] References Cited

FOREIGN PATENT DOCUMENTS

| 0018294 | 10/1980 | European Pat. Off. | 248/479 |
| 2287153 | 2/1975 | France | 248/486 |
| 2579148 | 9/1986 | France | 350/632 |
| 2622521 | 10/1987 | France | 350/632 |

Primary Examiner—Bruce Y. Arnold
Assistant Examiner—J. P. Ryan
Attorney, Agent, or Firm—Michael J. Striker

[57] ABSTRACT

A support for an external rearview mirror for motor vehicles that comprises a support rod having an intermediate vetical portion for supporting the mirror and upper and lower transverse portions extending substantially horizontally from opposite ends of the vertical portion. Upper and lower base arrangements connected with respective free ends of the upper and lower transverse portions for attaching the support to a vehicle body. The upper transverse portion is pivotally attached to the upper base arrangement and the lower transverse portion of the support rod is fixedly attached to the lower base arrangement. The lower base arrangement includes a stabilizing mechanism for the mirror support.

3 Claims, 1 Drawing Sheet

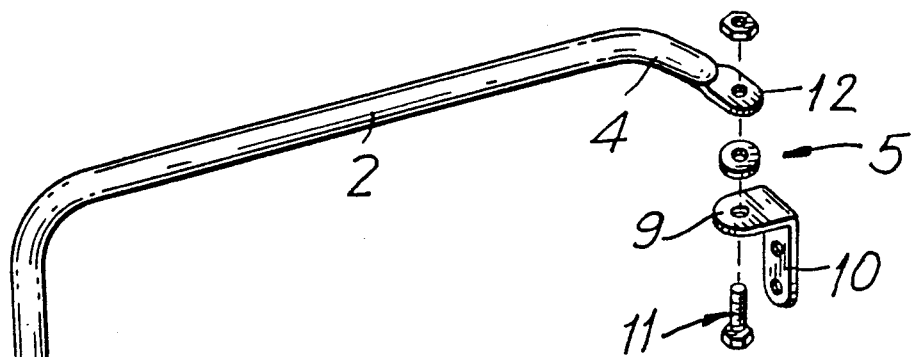
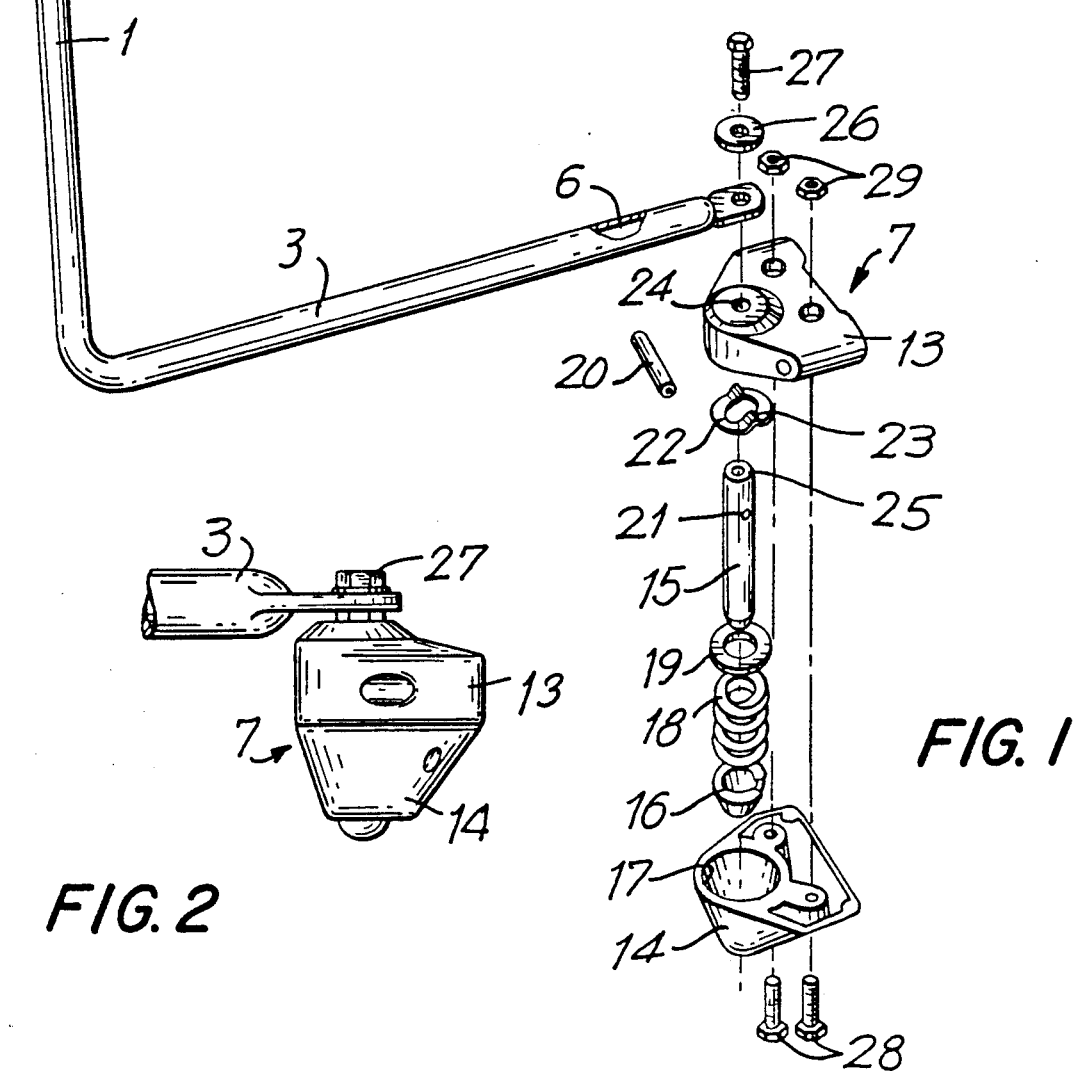
FIG. 2
FIG. 1

SUPPORT FOR AN EXTERNAL REARVIEW MIRROR FOR MOTOR VEHICLES

BACKGROUND OF THE INVENTION

The invention relates to a support for an external reaview mirror for heavy vehicles such as buses, trucks and the like.

Generally, supports for external rearview mirrors for motor vehicles are widely known and used. However, the known conventional support does not have a sufficient stability against wind and vibrations. Also, they do not have appropriate means that would permit their easy adjustment by a vehicle driver.

SUMMARY OF THE INVENTION

The object of the invention is a support for an external rearview mirror which is stable against wind and vibration and is easily adjustable.

The object of the invention is achieved by providing a support for an external rearview mirror for motor vehicles which comprises a substantially C-shaped support rod having an intermediate vertical portion for supporting the mirror and upper and lower transverse portions extending substantially horizontally from opposite ends of the vertical portion. The free ends of the transverse portions are connected with first and second base means for being attached to a vehicle body. One of the first and second base means includes means for pivotally attaching a respective free end of one of the upper and lower transverse portions of the support rod to the vehicle body. Another one of the first and second base means include means for fixedly attaching a respective free end to the vehicle body. The fixedly attaching means includes means for stabilizing the support position. The stabilizing means includes a support body consisting of upper and lower support elements and a pin having an upper end portion projecting through an opening in the upper support element and an opening in the free end portion of the another of the upper and lower transverse portions of the support rod. A support is provided for receiving a lower end portion of the pin. This support is received in a seat in the lower support element. An elastic pin extends through a through radial opening formed in the pin adjacent to the upper end portion of the pin. A washer is located in the upper support element and has folds for receiving the pin. A helical spring extends between an end surface of the seat in the lower support element and the elastic pin. The upper end portion of the pin has axial recesses formed thereon. The fixedly attaching means further include a washer overlying the free end of the another of the upper and lower transverse portions of the support rod and having an opening provided with teeth cooperating with the axial recesses on the upper end portion of the pin to secure the pin against rotation. Thread means secure the overlying washer to the free end of the another of the upper and lower transverse portions of the support rod.

The upper end portion of the pin has an axial thread blind hole. The thread means comprises a screw received in the thread blind hole.

The free end of the one of the upper and lower transverse portions of the support rod has an end ear. The first base means comprises a L-shaped bracket. The pivotally attaching means comprises a pivot screw extending through an orifice in a short leg of the L-shaped bracket and the end ear overlying the short leg. A nut secures the pivot screw.

The present invention both as to its construction so to its method of operation, together with additional objects and advantages thereof, will be best understood from the following detailed description of specific embodiments when read in connection with the accompanying drawings.

BRIEF DESCRIPTION OF THE DRAWINGS

FIG. 1 shows an exploded view of an external rearview mirror support according to the invention;

FIG. 2 shows a side view of one of support means that supports the an external rearview mirror support on the vehicle body.

DETAILED DESCRIPTION OF THE PREFERRED EMBODIMENT

A support for an external rearview mirror according to the invention and shown in the attached drawings comprises an approximately C-shaped support rod for supporting a mirror. The support rod has an intermediate vertical portion 1 on which the mirror is supported, and upper 2 and lower 3 substantially parallel transverse portions extending substantially horizontally from opposite ends of the vertical portion. The upper transverse portion has an end portion 4 extending at an angle to the remaining part of the upper transverse portion and pivotally attachable to the vehicle body. A support base 5 serves to pivotally attach the end portion 4 to the vehicle body. The support base 5 includes an inverted L-shaped bracket having a short leg 9 and a long leg 10 with openings that provide for attachment of the bracket to the vehicle with appropriate means (not shown). The end portion 4 has an end ear 12 which is attached to the short leg 9 with a pivot screw 11 that is secured to the short leg 9 with a nut 11a.

The lower transverse portion 3 has a reinforcement 6, and an ear portion 8 is provided at the free end of the lower transverse portion. The ear portion 8 is secured to a support base attachable to the vehicle body. The support base 7 includes a support body consisting of an upper substantially triangular prismatic element 13 and a lower conical truncated element 14, and a positioning and stabilizing mechanism. The positioning and stabilizing mechanism comprises a pin 15 supported in a support member 16 received in a seat 17 of the conical truncated element 14, and a helical spring 18 extending around the pin 15. The helical spring 18 extends between an end surface of the seat 17 and an elastic pin 20 extending through a through radial orifice 21 in the upper portion of the pin 15. The pin 20 is located in folds 23 of a washer 22. The upper end portion of the pin 15 projects through an axial opening 24 of the upper element 13. The upper end portion of the pin 15 has a plurality of axially extending recesses that cooperate with respective teeth formed on the inner surface of an orifice of a washer 26 that engages an upper surface of the ear portion 8 of the lower transverse portion 3 of the support rod. The washer 26 is secured to the ear portion 8 with a screw 27 screwed into a thread blind axial orifice formed in the upper portion of the pin 15.

The two elements 13 and 14 are connected with each other with screws 28 extending through respective openings in the elements 13 and 14, and nuts 29.

While the invention has been illustrated and described as embodied in an external rearview mirror support for motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A support for an external rearview mirror for motor vehicles, comprising a support rod having an intermediate vertical portion for supporting the mirror and upper and lower transverse portions extending substantially horizontally from opposite ends of said vertical portion and having free ends; and first and second base means connected with respective free ends of said upper and lower transverse portions for attaching said support to a vehicle body, one of said first and second base means including means for pivotally attaching a respective free end of one of said upper and lower transverse portions of said support rod to the vehicle body, and another one of said first and second base means including means for fixedly attaching a free end of another of said upper and lower transverse portions of said support rod to the vehicle body, said second base means including a support body consisting of upper and lower support elements, said fixedly attaching means including a pin having an upper end portion projecting through an opening in said upper support element and an opening in the free end portion of said another of said upper and lower transverse portions of said support rod, a support for receiving a lower end portion of said pin and received in a seat in said lower support element, an elastic pin extending through a through radial opening formed in said pin adjacent to said upper end portion of said pin, a washer located in said upper support element and having folds for receiving said elastic pin, a helical spring extending between an end surface of said seat in said lower support element and said elastic pin, said upper end portion of said pin having axial recesses formed thereon, said fixedly attaching means further including a washer overlying the free end of said another of said upper and lower transverse portions of said support rod and having an opening provided with teeth cooperating with said axial recesses on said upper end portion of said pin to secure said pin against rotation, and thread means for securing said overlying washer to said free end of said another of said upper and lower transverse portions of said support rod.

2. A support as set forth in claim 1, wherein said upper end portion of said pin has an axial thread blind hole, said thread means comprising a screw received in said thread blind hole.

3. A support as set forth in claim 1, wherein the free end of said one of said upper and lower transverse portions of said support rod has an end ear, said first base means comprising a L-shaped bracket, said pivotally attaching means comprising a pivot screw extending through an orifice in a short leg of said L-shaped bracket and said end ear overlying said short leg, and a nut for fixing said pivot screw.

* * * * *